United States Patent
Markowitz et al.

(10) Patent No.: US 7,705,062 B2
(45) Date of Patent: Apr. 27, 2010

(54) NANOPOROUS ORGANOSILICAS AS PRE-CONCENTRATION MATERIALS FOR SENSORS

(75) Inventors: Michael Markowitz, Springfield, VA (US); Mazyar Zeinali, Columbia, MD (US); Scott Trammell, Springfield, VA (US); Paul Charles, Bowie, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 620 days.

(21) Appl. No.: 11/307,286

(22) Filed: Jan. 31, 2006

(65) Prior Publication Data

US 2007/0054418 A1    Mar. 8, 2007

Related U.S. Application Data

(60) Provisional application No. 60/718,243, filed on Sep. 8, 2005.

(51) Int. Cl.
*C08J 9/00*   (2006.01)
*B01D 15/00*  (2006.01)
*C08G 77/02*  (2006.01)

(52) U.S. Cl. .......... 521/99; 521/100; 521/110; 436/815; 210/690; 528/10

(58) Field of Classification Search ........ 521/100, 521/110
See application file for complete search history.

(56) References Cited

U.S. PATENT DOCUMENTS

| 5,106,691 A | 4/1992 | Harwell et al. |
| 5,110,833 A | 5/1992 | Mosbach |
| 5,250,282 A | 10/1993 | Kresge et al. |
| 5,304,363 A | 4/1994 | Beck et al. |
| 5,310,648 A | 5/1994 | Arnold et al. |
| 5,321,102 A | 6/1994 | Loy et al. |
| 5,396,020 A | 3/1995 | Lansbarkis |
| 5,449,853 A | 9/1995 | Lansbarkis et al. |
| 5,461,175 A | 10/1995 | Fischer et al. |
| 5,538,710 A | 7/1996 | Guo et al. |
| 5,622,684 A | 4/1997 | Pinnavaia et al. |
| 5,630,978 A | 5/1997 | Domb |
| 5,756,717 A | 5/1998 | Paliwal et al. |

(Continued)

OTHER PUBLICATIONS

"Template-Based Approaches to the Preparation of Amorphous, Nanoporous Silicas", Raman et al. Chemistry of Materials, 1996, 8, 1682-1701.*

"Bridged Polysilsesquioxanes. Molecular-Engineered Hybrid Organic-Inorganic Materials", Shea et al. Chemistry of Materials, 2001, 13, 3306-3319.*

(Continued)

*Primary Examiner*—Randy Gulakowski
*Assistant Examiner*—Robert Loewe
(74) *Attorney, Agent, or Firm*—Amy L. Ressing; Joseph T. Grunkemeyer

(57) ABSTRACT

A molecularly imprinted material made from polymerizing a monomer having the structural formula $(OR)_3Si-B-A-B-Si(OR)_3$. A is a divalent organic group, B is a saturated or unsaturated divalent hydrocarbon group or a covalent bond, and R is an independently selected saturated or unsaturated monovalent hydrocarbon group. A preconcentrator having: a container comprising in inlet and an outlet and the above material within the container. The inlet is capable of allowing a fluid to enter the container. The outlet is capable of being coupled to a sensor and of allowing the fluid to exit the container.

16 Claims, 2 Drawing Sheets

U.S. PATENT DOCUMENTS

| | | | |
|---|---|---|---|
| 5,770,275 | A * | 6/1998 | Raman et al. ............... 427/535 |
| 5,795,559 | A | 8/1998 | Pinnavaia et al. |
| 5,821,311 | A | 10/1998 | Mosbach et al. |
| 5,872,198 | A | 2/1999 | Mosbach et al. |
| 5,910,554 | A | 6/1999 | Kempe et al. |
| 6,171,378 | B1 * | 1/2001 | Manginell et al. ............. 96/143 |
| 6,217,901 | B1 | 4/2001 | Perrott et al. |
| 6,310,110 | B1 | 10/2001 | Markowitz et al. |
| 6,380,266 | B1 | 4/2002 | Katz et al. |
| 6,417,236 | B1 * | 7/2002 | Hobson et al. ............. 514/759 |
| 6,423,770 | B1 | 7/2002 | Katz |
| 6,548,690 | B2 | 4/2003 | Mimoun |
| 6,583,191 | B2 | 6/2003 | Markowitz et al. |
| 6,660,780 | B2 | 12/2003 | Markowitz et al. |
| 6,673,246 | B2 | 1/2004 | Markowitz et al. |
| 6,713,416 | B2 | 3/2004 | Markowitz et al. |
| 7,168,298 | B1 * | 1/2007 | Manginell et al. .......... 73/54.25 |
| 7,211,192 | B2 * | 5/2007 | Shea et al .................... 210/634 |
| 7,358,316 | B2 * | 4/2008 | Ko et al. ....................... 528/12 |
| 7,422,724 | B1 * | 9/2008 | Manginell et al. ............. 422/88 |
| 2003/0157344 | A1 * | 8/2003 | Shoup et al. ................ 428/447 |
| 2003/0176396 | A1 * | 9/2003 | Shea et al. .................... 514/63 |
| 2003/0191269 | A1 * | 10/2003 | Ko et al. ....................... 528/10 |

OTHER PUBLICATIONS

Dai et al. J. Am. Chem. Soc. 2000, 122, 992-993.*

Diaz-Garcia et al. Microchimia Acta, 2005, 149, 19-36.*

Asefa et al., "Periodic mesoporous organosillcas with organic groups inside the channel walls" *Nature* 402, 868.

Burleigh et al., "Direct Synthesis of Periodic Mesoporous Organosilicas: Functional Incorporation by Co-condensation with Organosilanes" *J. Phy. Chem. B* 2001, 105, 9935-9942.

Burleigh et al., "Porous Polysilsesquioxanes for the Adsorption of Phenols" *Environ. Sci. Technol.* 2002, 35, 2515-2518.

Inagaki et al. "Novel Mesoporous Materials with a Uniform Distribution of Organic Groups and Inorganic Oxide in Their Frameworks" *J. Am. Chem. Soc.* 1999, 121, 9611-9614.

Markowitz et al, "Surface Acidity and Basicity of Functionalized Silica Particles" Colloids and Surfaces A: Physicochem Eng. Aspects 150, 85-94 (1999).

Melde et al., "Mesoporous Sieves with Unified Hybrid Inorganic/Organic Frameworks" *Chem. Mater*. 1999, 11, 3302-3308.

Vartuli, et al, "Effect of Surfactant/Silica Molar ratios on the Formation of Mesoporous Molecular Sieves: Inorganic Mimicry of Surfactant Liquid-Crystal Phases and Mechanistic Implications" Chemistry of Materials, 6, 2317 2326 (1994).

Wulff et al., "Enzyme models Based on Molecularly Imprinted Polymers with Strong Esterase Activity" Angew. Chem. Int. Ed. Engl., 36 1961 (1997).

Wulff, "Molecular Imprinting in Cross-Linked Materials with the Aid of Molecular Templates—A Way towards Artificial Antibodies"Angew. Chem. Intl. Ed. Engl., 34, 1812-1832 (1995).

* cited by examiner

NANOPOROUS ORGANOSILICAS AS PRE-CONCENTRATION MATERIALS FOR SENSORS

CROSS REFERENCE TO RELATED APPLICATIONS

This application claims the benefit of U.S. Provisional Patent Application No. 60/718,243, filed on Sep. 8, 2005, incorporated herein by reference.

FIELD OF THE INVENTION

The invention relates generally to sensors and polymers used in sensors.

DESCRIPTION OF RELATED ART

The sensitivity of sensors to detect specific analytes is proportional to the concentration of the target analyte. Pre-concentration allows the collection of enough sample mass to obtain detectable signals from a sensor array. Preconcentrators have been used in analytical chemistry applications for collecting analytes that are present in very low concentrations in air or water. To achieve the goal of efficient preconcentration, the preconcentrator may have the following attributes: Selectivity, high adsorption capacity, rapid adsorption/desorption kinetics, and low fouling. Many sorbents were developed to act as adsorbers of molecules and as sensor preconcentrators. However, no perfect sorbents for all analytes exist. One major drawback is the low rate of analyte desorption from most of these sorbents (Davis et al., *Sensors and Actuators B*, 104, 207 (2005). All referenced publications and patent documents are incorporated herein by reference.). Other sorbents have relatively low adsorption capacities although they meet a number of the criteria for use as preconcentrators (Lu et al., *Anal. Chem.*, 73, 3449 (2001)). Because of these less-than-perfect features of currently available adsorbent resins, portable systems for doing quantitative analysis of multianalyte, low concentration air samples (in industrial hygiene for example), are fairly complicated. Consequently, new materials are key to the development of pre-concentration methods for trace detection of chemical species.

Efficient preconcentration materials would impact all sensor technology and offers the potential for an ultra-sensitive sensor suite with millisecond to seconds response time for the detection of explosives, chemical agents, and other targeted molecules in field-deployable instruments (i.e. UAVs, UUVs, and hand held detection devices for first responders). Because of their high adsorption capacity as well as mechanical and chemical stability, organosilica sorbents are gaining increasing attention as preconcentrating materials. However, current materials have deficiencies in the areas of desorption and fouling.

BRIEF SUMMARY OF THE INVENTION

The invention comprises a molecularly imprinted material comprising surfaces that define a plurality of molecularly imprinted cavities. The structure comprises a polymer made from polymerizing a monomer having the structural formula $(OR)_3Si-B-A-B-Si(OR)_3$. A is a divalent organic group. Each B is an independently selected saturated or unsaturated divalent hydrocarbon group or a covalent bond. Each R is an independently selected saturated or unsaturated monovalent hydrocarbon group.

The invention further comprises a preconcentrator comprising: a container comprising in inlet and an outlet and a material within the container. The inlet is capable of allowing a fluid to enter the container. The outlet is capable of being coupled to a sensor and of allowing the fluid to exit the container. The material comprises the above polymer.

The invention further comprises a method of making a material having a molecularly imprinted surface comprising: providing a solvent, the above monomer, and a surfactant coupled to an imprint group; combining the solvent, the monomer, and the surfactant; polymerizing the monomer to form a solid structure; and removing a supramolecular structure from the solid structure. Molecules of the surfactant self-assemble to form the supramolecular structure having a surface with the imprint groups are exposed on the surface. The supramolecular structure serves as a template for the organizing of molecules of the monomer along the surface of the supramolecular structure and around the exposed imprint groups. The solid structure has a surface topography complementary to the surface topography of the supramolecular structure and has indentations complementary to the shape of the exposed imprint groups.

BRIEF DESCRIPTION OF THE DRAWINGS

A more complete appreciation of the invention will be readily obtained by reference to the following Description of the Example Embodiments and the accompanying drawings.

DETAILED DESCRIPTION OF EXAMPLE EMBODIMENTS

Figure 1:
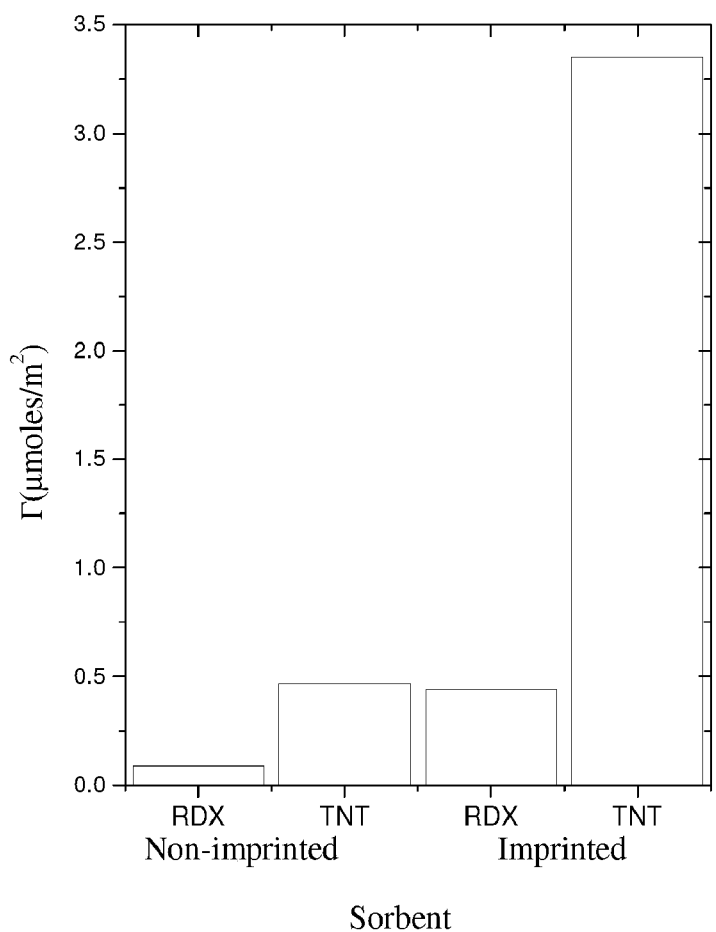
FIG. 1 shows competitive sorption onto TDMI PMO from multi-sorbent explosives contaminated soil extract.

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods and devices are omitted so as to not obscure the description of the present invention with unnecessary detail.

Described herein is the use of nanoporous organosilicas for rapid pre-concentration and extraction placed in-line with highly sensitive sensing techniques. The pre-concentration sorbent can be a highly selective adsorbing organic-inorganic hybrid polymer with high surface area and porosity. Silica-based organic-inorganic hybrid materials can be incorporated into optically-based sensors and on a variety of electroactive materials including but not limited to carbon composites, solid metal and metal oxide electrodes all of which may be implemented with lab-on-a-chip technology. Because this sorbent may be regenerated, desorption can be rapid thereby enabling fast sensor response times.

Periodic mesoporous organosilicas (PMOs) are organic-inorganic polymers with highly ordered pore networks and large internal surface areas. First reported in 1999 (Inagaki et al., *J. Am. Chem. Soc.*, 121, 9611 (1999); Asefa et al., *Nature*, 402, 867 (1999); Melde et al., *Chem. Mater.*, 11, 3302 (1999)), PMOs were synthesized using a surfactant template approach (Burleigh et al., *J. Phys. Chem. B*, 105, 9935 (2001)) and have narrow pore size distributions with few blocked pores or obstructions commonly found in amorphous materials to impede molecular diffusion throughout their pore networks. The open pore structures of these high surface area materials, typically >1,000 m²/g, allow for fast access of molecules and ions in the liquid or gas phase to the functional groups on their solid surfaces.

The alternating siloxane and organic moieties give PMOs a combination of properties normally associated with both organic and inorganic materials. The siloxane groups give these materials the structural rigidity required to employ such a template method. In addition to structural rigidity, the silica component of the PMOs gives them a degree of hydrophilicity useful for applications in aqueous systems such as formation of lower fouling membranes. The presence of organic functional groups within the PMO matrix gives these materials many of the favorable properties associated with organic polymers, but with improved accessibility to functional sites due to their open pore structure. Experimental parameters, such as the selection of different precursors, surfactants, and functional silanes, allow one to design porous materials with very specific structural and chemical properties.

It has been demonstrated that diethylbenzene-bridged mesoporous organosilica preferentially adsorbs aromatic hydrocarbons comparably to that of activated carbon and can be readily regenerated (Burleigh et al., *Environ. Sci. Technol.*, 36, 2515 (2002)). Greater than 96% of aromatic phenols were absorbed within the first minute and greater than 99% within 15 minutes. Furthermore, in a competitive adsorption environment containing p-nitrophenol, p-cresol, and TNT, greater than 75%, 73%, and 85% of adsorption was complete within the first minute of contact time.

The basis for these results is the fundamental interactions between the functional groups of the sorbate and PMO sorbent. For instance, the primary mechanism for adsorption of aromatic compounds (based on NMR data) is the π-π interactions between an aromatic sorbate such as TNT and the diethylbenzene bridging groups of the PMO. Furthermore, it has been demonstrated that the adsorption sites can be organized on the PMO surface to engineer a material that has both greater adsorption capacity and selectivity for the sorbate. The process developed to do this is Template Directed Molecular Imprinting (TDMI) and involves introducing a surfactant with a structure similar to that of the sorbate and PMO sorbent bridging group. (Methods related to TDMI are disclosed in U.S. Pat. Nos. 6,310,110; 6,583,191; and 6,660,780.) Solid-state NMR analysis of the resulting materials demonstrates that the TDMI process may effect a reorganization of the PMO adsorption sites from a heterogeneous to homogeneous population. This leads to a sharp increase in adsorption capacity and imparts selectivity for the sorbate. As demonstrated in Example 2 below, the material was highly selective for TNT from multi-component competitive mixtures. The imprinted material to selectively adsorbed TNT from soil leachate with the surface excess increased by more than 7 fold due to imprinting. The contaminated soil solution also contained high DOC, but the findings show minimal interference from DOC.

The monomer may be made by methods known in the art. Suitable monomers include, but are not limited to, silsesquioxane monomer such as those disclosed in U.S. Pat. No. 6,673,246, 1,4-bis(trimethoxysilylethyl)benzene (($OCH_3$)$_3$Si—$(CH_2)_2$—$C_6H_4$—$(CH_2)_2$—Si($OCH_3$)$_3$), and 1,4-bis(trimethoxysilyl)benzene (($OCH_3$)$_3$Si—$C_6H_4$—Si($OCH_3$)$_3$). Other suitable moieties within the monomer include, but are not limited to, arylene for A and $C_1$, $C_2$, $C_3$, $C_4$, $C_5$, or $C_6$ hydrocarbon for B and R.

The monomer may be polymerized by methods known in the art, such as base catalyzed hydrolysis and condensation. Some polymerization methods are disclosed in U.S. Pat. No. 6,673,246. Suitable surfactants include, but are not limited to, $C_{18}H_{37}(OCH_2CH_2)_{10}OH$ (Brij 76). Suitable imprint groups include, but are not limited to, decylaminetrinitrobenzene. This imprint group may produce cavities selective for TNT. The material may also be made without an imprint group. The technique has resulted in a high surface area (such as up to 1000 m²/g) and low density (such as 0.3-0.5 g/cc) material that may useful for explosives extraction and pre-concentration. The material may be a nanoporous organosilica, such as a PMO, having an average pore size of about 0-50 nm. As used herein, the term "nanoporous" includes a pore size of 0, meaning that the material has no pores. The polymerization may be a copolymerization with one or more additional monomers that may also be of the form $(OR)_3Si$—B-A-B—$Si(OR)_3$, may have any other organic group in place of B-A-B, or may be a tetraalkoxysilane.

The preconcentrator may comprise the material either with or without the molecularly imprinted cavities. The preconcentrator may be used in a method of detecting an analyte. A sensor is coupled to the outlet of the preconcentrator. A fluid suspected of containing the analyte is moved into the inlet and in contact with the material. This concentrates the analyte in the material, included in the molecularly imprinted cavities. The material is contacted with a solvent capable of removing the analyte from the material. Then the sensor is contacted with the solvent for detecting the analyte.

The molecularly imprinted cavities may be selective for 2,4,6-trinitrotoluene, for example. Such cavities may also have affinity for other nitroamines and aromatics as well.

The material may further comprise one or more pendant functional groups for a variety of purposes. Suitable purposes include, but are not limited to, complimentary binding affinity for the imprint group, metal chelation, and a gate to open and close the pores.

Characteristics of the material may include, but are not limited to:

Fast kinetics: 96% of nitroaromatic removed within one minute of contact time.

Regeneration: Column tests have shown virtually no difference with sorption characteristics with cycle #1 and cycle #10 of regenerated material.

High Capacity: Greater than 97% removal of TNT from solution with high initial concentration (10 mg/L).

Selectivity: The material has shown selectivity for TNT over other aromatics from multi-component solutions.

High sensitivity: At least 80% removal of TNT from solution with low initial concentration (10 µg/L).

Preconcentration: Initial studies reveal the ability to pre-concentrate TNT samples at least 2 orders of magnitude. Furthermore, extraction can be achieved with a low volume of extraction solvent (currently 1-5 mL) and can possibly be orders of magnitude smaller (<100 µL), offering the possibility for further improvements in preconcentration and microchip applications.

Useable in Varied and Complex Matrices Contaminated Soil Extracts: Adsorption studies for TNT removal from aqueous soil extracts (containing TNT and natural organic matter) from highly contaminated soils from Umatilla Army Depot Activity, Hermiston, Oreg. showed high removal of TNT in the presence of soil organic matter.

Vapor Phase (VOC): At least 80% reduction in n-hexane vapor phase concentration from an initial concentration of 100 mg/L.

Multi-use Surfaces: Selectivity for other targeted compounds can be achieved through modification of the imprinting process.

The nanoporous organosilica materials may provide at least 2 orders of magnitude improvement in preconcentration/sensitivity. Selective and efficient preconcentration methods may impact all sensor technology and offers the potential for an ultra-sensitive sensor suite with millisecond to seconds response time for the detection of explosives, chemical agents and other targeted molecules in field-deployable instruments such as UAVs, UUVs, and hand held detection devices for first responders.

Having described the invention, the following examples are given to illustrate specific applications of the invention. These specific examples are not intended to limit the scope of the invention described in this application.

Example 1

Preparation of template-directed molecularly imprinted hybrid organic-inorganic polymers—In general, arylene-bridged polysilsesquioxane materials were synthesized by the hydrolysis and condensation of trialkoxysilyl precursors under basic or acidic conditions. Brij 76 was used to increase the porosity and surface areas of these materials via the surfactant template approach. Structural characterization of these materials was carried out by nitrogen gas sorption, TGA, and X-ray diffraction (XRD). The adsorption of nitroaromatic compounds has been investigated by both batch and column testing.

The structural parameters calculated from nitrogen gas sorption measurements of two imprinted polymers are shown in Table 1. This demonstrates the formation of molecularly imprinted benzene- and diethylbenzene-bridged hybrid organic-inorganic polymers.

TABLE 1

Nitrogen gas adsorption data of porous sorbents.

| TDMI polymer | BET surface area ($m^2/g$) | Total Pore Volume ($cm^3/g$) | BJH Pore Diameter (Å) |
|---|---|---|---|
| Diethylbenzene-bridged | 550 | 0.40 | 30 |
| Benzene-bridged | 1300 | 1.10 | 33 |

Example 2

Selectivity for TNT—Adsorption studies for TNT removal from aqueous soil extracts (containing TNT and natural organic matter) from highly contaminated soils from Umatilla Army Depot Activity, Hermiston, Oreg. showed high removal of TNT in the presence of soil organic matter (FIG. 1). This demonstrates that the TDMI polymer has shown selectivity for TNT over other aromatics from multi-component solutions in varied and complex environments. This also demonstrates the utility of the TDMI polymer to efficiently pre-concentrate TNT with a low volume of extraction solvent and that adsorption was unaffected by DOC.

Example 3

Figure 2:
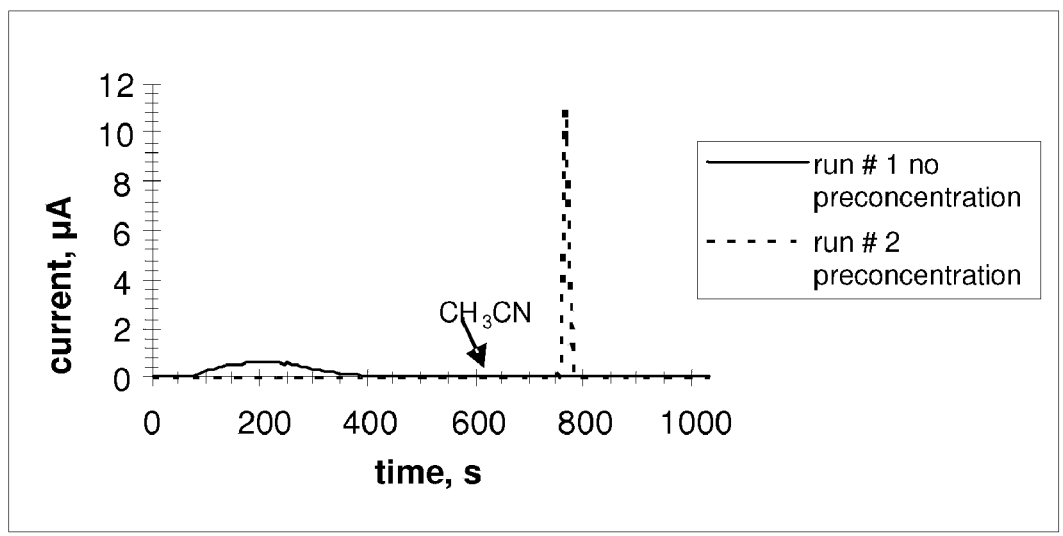
FIG. 2 shows electrochemical detection of TNT.
Figure 3:
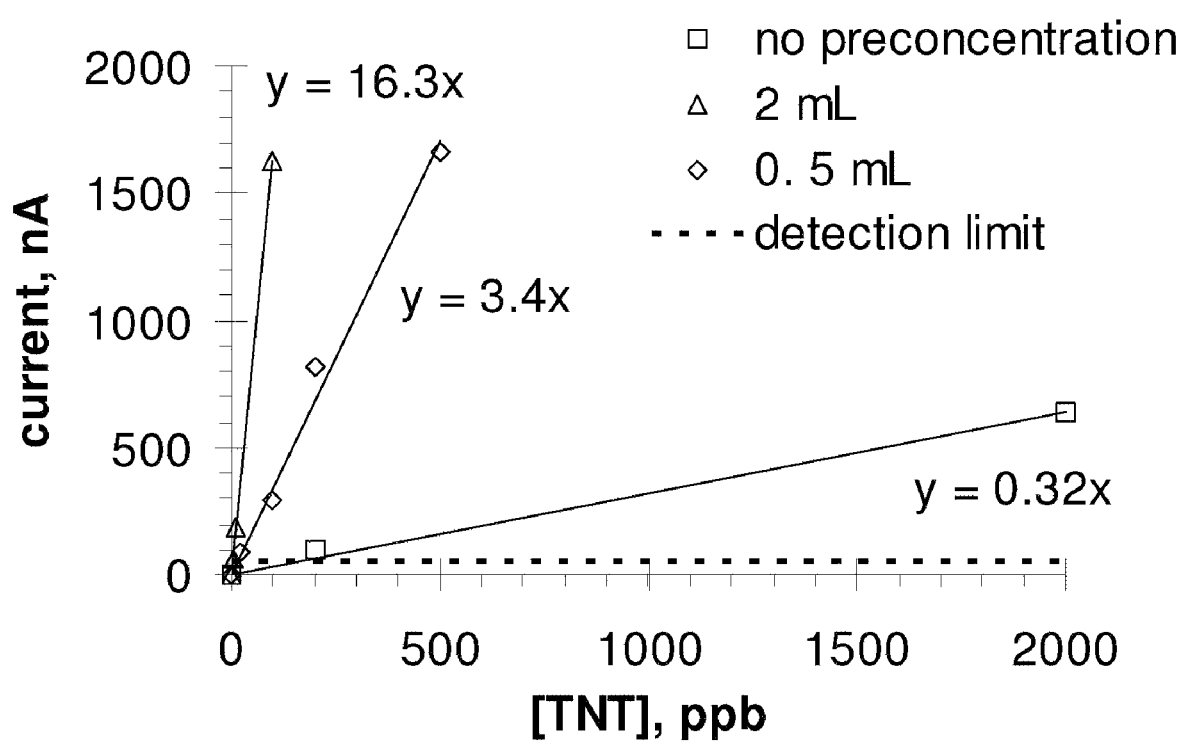
FIG. 3 shows detection of TNT at trace levels.

In-line sampling—TNT (500 μL at 2 ppm) was pre-concentrated using a microcapillary-column packed with 10 mg of a nanoporous organosilicate imprinted for TNT. The micro-column was placed in-line with a low-pressure injector loop and a syringe pump before the electrochemical detector. After pre-concentration of the sample, the TNT was rapidly eluted from the column with $CH_3CN$. The electrochemical response of TNT dramatically improved compared to an identical assay with no pre-concentration (FIG. 2). The response time was a function of the slow flow rate used and further engineering can greatly reduce the response time. The peak response was much sharper with peak amplitude increased by an order of magnitude. Further experiments increasing the pre-concentration volume with lower TNT concentrations demonstrated the potential to rapidly detect TNT at trace levels (ppb) (FIG. 3). This demonstrates that the TDMI polymer is an efficient pre-concentration material for effective detection of chemical species.

Obviously, many modifications and variations of the present invention are possible in light of the above teachings. It is therefore to be understood that the claimed invention may be practiced otherwise than as specifically described. Any reference to claim elements in the singular, e.g., using the articles "a," "an," "the," or "said" is not construed as limiting the element to the singular.

What is claimed as new and desired to be protected by Letters Patent of the United States is:

1. A molecularly imprinted material comprising pores or channels having surfaces that include a plurality of molecularly imprinted cavities;
    wherein the material comprises a polymer made from polymerizing a monomer having the structural formula (OR)$_3$Si—B-A-B—Si(OR)$_3$;
    wherein A is a divalent organic group;
    wherein each B is an independently selected saturated or unsaturated divalent hydrocarbon group or a covalent bond;
    wherein each R is an independently selected saturated or unsaturated monovalent hydrocarbon group; and
    wherein the material is made by a method comprising:
    combining a solvent, the monomer, and a surfactant coupled to an imprint group;
        wherein the imprint group is decylaminetrinitrobenzene;
        wherein molecules of the surfactant self-assemble to form at least one supramolecular structure having a surface and wherein the imprint groups are exposed on the surface; and
        wherein the supramolecular structure serves as a template for the organizing of molecules of the monomer along the surface of the supramolecular structure and around the exposed imprint groups;
    polymerizing the monomer to form a solid structure having a surface topography complementary to the surface topography of the supramolecular structure and having indentations complementary to the shape of the exposed imprint groups; and
    removing the supramolecular structure from the solid structure.

2. The material of claim 1, wherein polymerizing the monomer comprises copolymerizing the monomer with one or more additional monomers.

3. The material of claim 1, wherein the material further comprises one or more pendant functional groups.

4. A preconcentrator comprising:
    a container comprising in inlet and an outlet;
        wherein the inlet is capable of allowing a fluid to enter the container; and
        wherein the outlet is capable of being coupled to a sensor; and
    the material of claim 1 within the container.

5. A method of detecting an analyte comprising:
    providing the preconcentrator of claim 4;
    providing a sensor coupled to the outlet;

moving a fluid suspected of containing the analyte into the inlet and in contact with the material;
contacting the material with a solvent capable of removing the analyte from the material; and
contacting the sensor with the solvent.

6. The material of claim 1, wherein the monomer is 1,4-bis(trimethoxysilyl)benzene or 1,4-bis(trimethoxysilylethyl)benzene.

7. A preconcentrator comprising:
a container comprising in inlet and an outlet;
   wherein the inlet is capable of allowing a fluid to enter the container; and
   wherein the outlet is capable of being coupled to a sensor and of allowing the fluid to exit the container; and
a material within the container;
   wherein the material comprises a polymer made from polymerizing a monomer having the structural formula $(OR)_3Si$—B-A-B—$Si(OR)_3$;
   wherein A is a divalent organic group;
   wherein each B is an independently selected saturated or unsaturated divalent hydrocarbon group or a covalent bond; and
   wherein each R is an independently selected saturated or unsaturated monovalent hydrocarbon group;
   wherein the material is made by a method comprising:
   combining a solvent, the 1,4-bis(trimethoxysilyl)benzene, and a surfactant coupled to an imprint group;
      wherein the imprint group is decylaminetrinitrobenzene;
      wherein molecules of the surfactant self-assemble to form at least one supramolecular structure having a surface and wherein the imprint groups are exposed on the surface; and
      wherein the supramolecular structure serves as a template for the organizing of molecules of the 1,4-bis(trimethoxysilyl)benzene along the surface of the supramolecular structure and around the exposed imprint groups;
   polymerizing the 1,4-bis(trimethoxysilyl)benzene to form a solid structure having a surface topography complementary to the surface topography of the supramolecular structure and having indentations complementary to the shape of the exposed imprint groups; and
   removing the supramolecular structure from the solid structure.

8. The preconcentrator of claim 7, wherein polymerizing the monomer comprises copolymerizing the monomer with one or more additional monomers.

9. The preconcentrator of claim 7, wherein the material further comprises one of more pendant functional groups.

10. A method of detecting an analyte comprising:
providing the preconcentrator of claim 7;
providing a sensor coupled to the outlet;
moving the fluid suspected of containing the analyte into the inlet and in contact with the material;
contacting the material with a solvent capable of removing the analyte from the material; and
contacting the sensor with the solvent.

11. The preconcentrator of claim 7, wherein the monomer is 1,4-bis(trimethoxysilyl)benzene or 1,4-bis(trimethoxysilylethyl)benzene.

12. A method of making a material having a molecularly imprinted surface comprising:
providing a solvent, a monomer, and a surfactant coupled to an imprint group;
   wherein the imprint group is decylaminetrinitrobenzene;
   wherein the monomer has the structural formula $(OR)_3Si$—B-A-B—$Si(OR)_3$;
   wherein A is a divalent organic group;
   wherein each B is an independently selected saturated or unsaturated divalent hydrocarbon group or a covalent bond; and
   wherein each R is an independently selected saturated or unsaturated monovalent hydrocarbon group;
combining the solvent, the monomer, and the surfactant;
   wherein molecules of the surfactant self assemble to form at least one supramolecular structure having a surface and wherein the imprint groups are exposed on the surface; and
   wherein the supramolecular structure serves as a template for the organizing of molecules of the monomer along the surface of the supramolecular structure and around the exposed imprint groups;
polymerizing the monomer to form a solid structure having a surface topography complementary to the surface topography of the supramolecular structure and having indentations complementary to the shape of the exposed imprint groups; and
removing the supramolecular structure from the solid structure.

13. The method of claim 12, wherein polymerizing the monomer comprises copolymerizing the monomer with one or more additional monomers.

14. The method of claim 12, wherein the surfactant is $C_{18}H_{37}(OCH_2CH_2)_{10}OH$.

15. The method of claim 12, wherein the material further comprises one of more pendant functional groups.

16. The method of claim 12, wherein the monomer is 1,4-bis(trimethoxysilyl)benzene or 1,4-bis(trimethoxysilylethyl)benzene.

* * * * *